United States Patent [19]

Onuma

[11] Patent Number: 4,830,079

[45] Date of Patent: May 16, 1989

[54] METHOD AND APPARATUS FOR MOUNTING TIRES ON WHEELS

[75] Inventor: Masashi Onuma, Toyota, Japan

[73] Assignee: Toyota Jidosha Kabushiki Kaisha, Japan

[21] Appl. No.: 692,865

[22] Filed: Jan. 18, 1985

Related U.S. Application Data

[63] Continuation of Ser. No. 454,860, Dec. 30, 1982.

[51] Int. Cl.⁴ .............................................. B60C 25/08
[52] U.S. Cl. .................................................. 157/1.24
[58] Field of Search ...................... 157/1.2, 1.22, 1.24, 157/14, 21

[56] References Cited

U.S. PATENT DOCUMENTS

| | | | |
|---|---|---|---|
| 3,238,982 | 3/1966 | Darr | 157/14 |
| 3,853,165 | 12/1974 | Collmann | 157/1.2 |
| 4,262,727 | 4/1981 | Schifferly | 157/1.24 |

*Primary Examiner*—James G. Smith
*Attorney, Agent, or Firm*—Finnegan, Henderson, Farabow, Garrett & Dunner

[57] ABSTRACT

Apparatus for mounting flexible tires on wheels comprising a vertically movable table lifter, a wheel centering shaft, bead spreading rollers and bead dropping rollers, the table lifter and the bead spreading rollers being provided with annular steps thereon, and means for automatically positioning the table lifter at a height, depending on the size of the wheel carried on the table, at which a predetermined vertical distance is left between the upper edge of the wheel rim and the stepped lower surface of the bead spreading rollers.

6 Claims, 5 Drawing Sheets

METHOD AND APPARATUS FOR MOUNTING TIRES ON WHEELS

This application is a continuation of application Ser. No. 454,860, filed Dec. 30, 1982.

BACKGROUND OF THE INVENTION

1. Field of the Invention:

The present invention relates to a method of mounting flexible tires on wheels, and apparatus for carrying out the method.

2. Description of Prior Art:

It has been customary in service shops to use simple tire changers for mounting tires on wheels. The tire changers, however, require a large number of steps for mounting tires, are not very durable in operation, and hence cannot be employed for use on automobile production lines. To cope with these problems, tire mounting machines have now found widespread use which have bead spreading rollers, a table lifter for moving the wheel up and down, and a rough guide attachment dependent on the size of a wheel which a tire is to be mounted. The wheel is laid flat over the table lifter, and the tire is half mounted on the wheel. Thereafter, the table lifter is raised by an actuator toward a stationary centering shaft. The shaft then engages in the hub hole of the wheel to align it, and the table lifter is then stopped.

In the position at which the table lifter is stopped, the lower surfaces of the bead spreading rollers are spaced from the rim of the wheel normally by a gap of 3 mm, and the bead spreading rollers project from the outer periphery of the wheel rim by a distance of 4 mm or more. With these gap and distance maintained, the bead spreading rollers are turned in the lefthand and righthand directions, respectively, through 180 degrees and turned back, for thereby mounting the tire on the wheel. If the gap and distance were smaller or larger than the indicated dimensions, the wheel would be injured and the tire bead would be damaged, resulting in less quality of the tire.

In order to keep the proper dimensions for the gap and distance, it has been necessary in the prior tire mounting machine that the table lifter, the centering shaft, and the bead spreading rollers be adjusted, and an attachment be employed which makes the dimension of the wheel to render the gap and distance constant for each wheel size. With this arrangement, where wheels of different sizes are randomly supplied to a tire mounting line, times required for positioning the various parts of the tire mounting machine become much longer and the rate of mounting the tires is extremely poor.

SUMMARY OF THE INVENTION

It is therefore an object of the present invention to provide a tire mounting method and apparatus for carrying out such method, by which it is possible to eliminate any time required for such adjustments to increase the rate of mounting tires and ensure tire mounting operation of high quality.

In order to achieve the above object, the method according to the invention includes the steps of providing coaxial annular steps on the upper surface of the table lifter, and further coaxial annular steps on the lower surface of each bead spreading roller; laying a wheel on the stepped upper surface of the table lifter; centering and fixing the wheel on the table lifter; positioning the table lifter, the bead spreading rollers, and the bead dropping rollers so that the bead spreading rollers and the bead dropping rollers engage with the tire beads and the tire flank, respectively, while leaving a predetermined vertical distance between the upper edge of the wheel rim and the stepped lower surface of each bead spreading roller; and turning the rollers around the axis of the wheel while maintaining constant the vertical distance.

According to the present invention, the tire mounting apparatus has a mechanism for mounting tires on wheels regardless of sizes thereof (13, 14, 15 inches and the like) and rim widths (4½J, 5J, 5½J, 6J and the like), a detector for detecting a wheel size (including a rim width), a rough guide including steps on a table lifter for matching wheel sizes, a centering shaft movable up and down, and bead spreading rollers having on their lower surfaces steps for coacting with the steps on the table lifter to sandwich the rim of a wheel mounted on the table lifter. The lower surfaces of the bead spreading rollers are spaced from an upper edge of the rim by a distance which remains constant independently of the size of the wheel placed on the table lifter. The tire mounting apparatus of the invention can mount tires on wheels with ease.

BRIEF DESCRIPTION OF DRAWINGS

Other objects, features and advantages of the present invention will now be described, by way of example, with reference to the accompanying drawings which show one preferred embodiment of the present invention, and in which.

DETAILED DESCRIPTION OF THE PREFERRED EMBODIMENT

Figure 1:
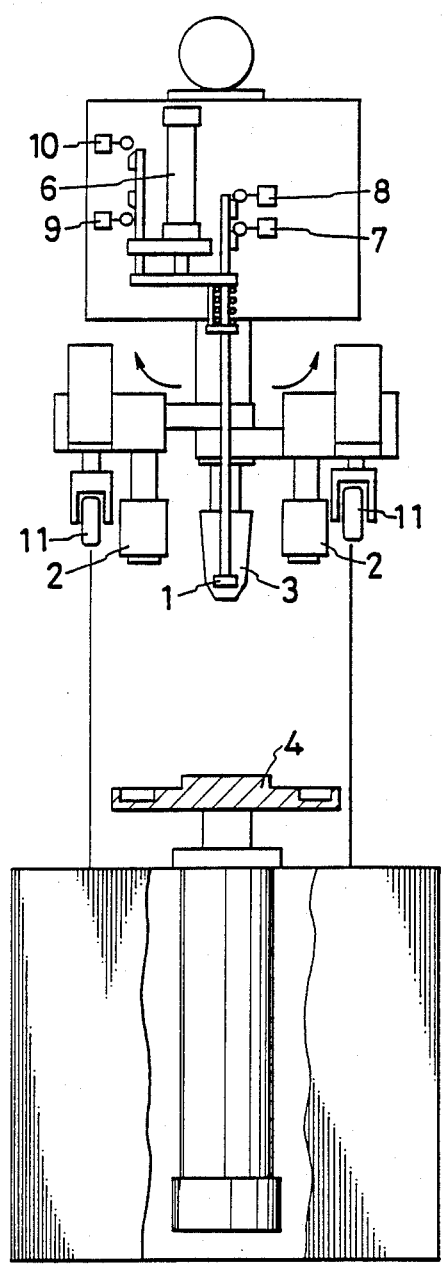
FIG. 1 is a front elevational view of the tire mounting apparatus of the present invention.
Figure 3:
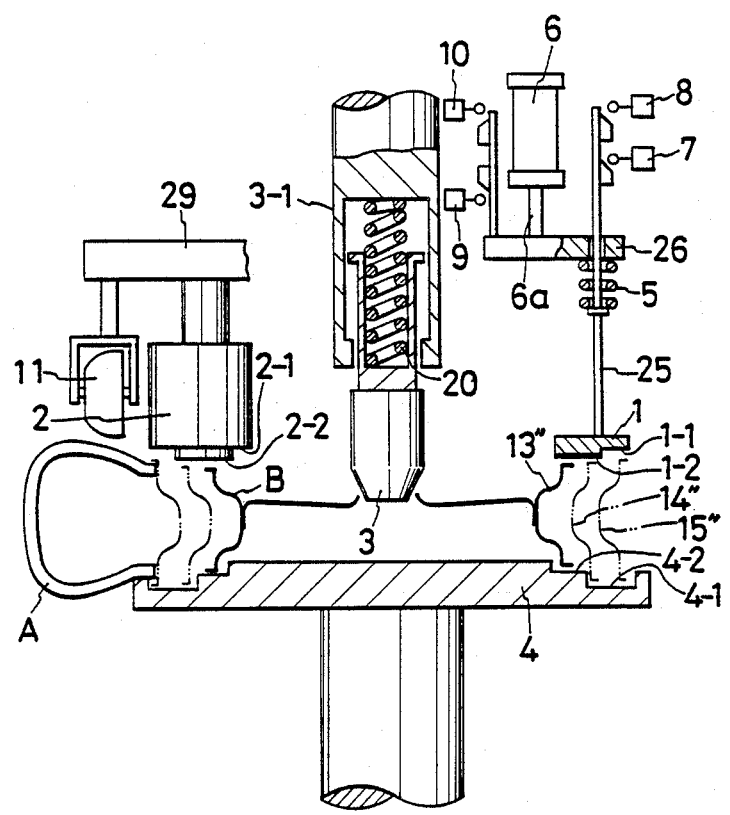
FIG. 3 is an enlarged fragmentary front elevational view of the tire mounting apparatus.
Figure 4:
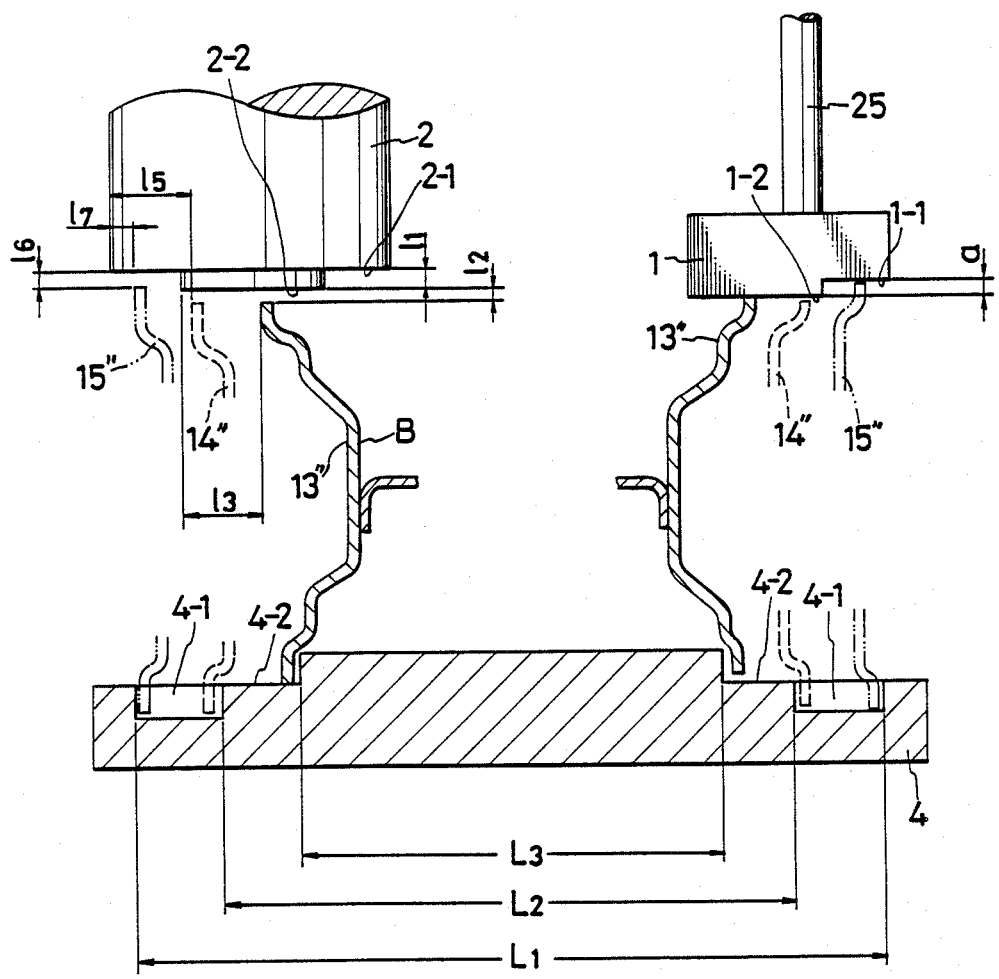
FIG. 4 is an enlarged diagram illustrative of the positional relationship between a bead spreading roller, a table lifter, and a wheel size detector plate.

The tire mounting apparatus according to the present invention has a circular table lifter 4 for placing a wheel thereon. As shown in FIGS. 1 and 4, the table lifter 4 has outer and inner annular stesp 4-1, 4-2, the outer annular step 4-1 being lower than the inner annular step 4-2. A centering shaft 3 is disposed coaxially with the table lifter 4 thereabove in confronting relation thereto, and is slidably mounted in a main shaft 3-1, as shown in FIG. 3, the centering shaft 3 being normally urged downwardly by a spring 20 disposed therein. When the table lifter 4 is lifted, the distal end of the center shaft 3 enters the hub hole in the wheel to thereby align the wheel automatically with the table lifter 4.

A wheel size detector plate 1 is disposed in confronting relation to the steps 4-1, 4-2 on an outer peripheral edge portion of the table lifter 4 and has on its lower surface outer and inner steps 1-1, 1-2 which coact with the steps 4-1, 4-2 to sandwich the rim of the wheel. The outer step 1-1 is located upwardly of the inner step 1-2.

In the illustrated embodiment, the rim of a wheel having a size of 13 inches, shown in solid lines. (33.02 cm) is clamped between the steps 1-2, 4-2. In shadow lines are shown the rim of a wheel having a size of 14 inches (35.56 cm) clamped between the steps 1-2, 4-1, and the rim of a wheel having a size of 15 inches (38.1 cm) clamped between the steps 1-1, 4-1 (see FIG. 3). Therefore, the table lifter 4 and the wheel size detector plate 1 have their relative positional relationship kept unchanged with different wheel sizes.

A support rod 25 which extends vertically upwardly is fixed to the wheel size detector plate 1. The wheel size detector plate 1 is normally urged downwardly by a coil spring 5 disposed around the support rod 25. A pneumatic cylinder actuator 6 has a piston rod 6a joined at its lower end to a stay 26. The piston rod 6a, as it is actuated, can move the wheel size detector plate 1 by means of the stay 26, the coil spring 5, and the support rod 25. The stay 26 has projections for actuating limit switches 9, 10, and support rod 25 has projections for actuating limit switches 7, 8.

When the limit switch 9 is turned on, it generates a signal to raise the table lifter 4, and when the limit switch 7 is turned on, it generates a signal to reduce the speed at which the table lifter 4 moves upwardly. When the limit switch 8 is turned on, it generates a signal to stop the upward movement of the table lifter 4, and when the limit switch 10 is turned on, it produces a signal to rotate bead spreading rollers 2 (described below). These limit switches are wired for cooperation with an electric control circuit (not shown) and a hydraulic circuit (FIG. 5).

The bead spreading rollers 2 have axes parallel to the axis of the table lifter 4, and are disposed above and in confronting relation to the steps 4-1, 4-2 on the table lifter 4. Each of the bead spreading rollers 2 has on its bottom surface a central lower step 2-2 and a higher step 2-1 extending around the central lower step 2-2. The rim of the wheel of the 13-inch size is positioned between the steps 2-2, 4-2 with the upper edge of the rim being spaced from the step 2-2 by a distance of $l_2$ when the table lifter 4 is in its uppermost positon, as shown in FIG. 4. As shown in shadow lines, the rim of the wheel of the 14-inch size is positioned between the steps 2-2, 4-1 with the upper edge of the rim being spaced from the step 2-2 by the same distance of $l_2$ when the table lifter 4 is in its uppermost position. The rim of the wheel of the 15-inch size is positioned between the steps 2-1, 4-1 with the upper edge of the rim being spaced from the step 2-1 by a distance of $l_6$ when the table lifter 4 is in its uppermost position. The distances $l_2$, $l_6$ should preferably be 3 mm. An outer edge of the rim of the 14-inch wheel should preferably be spaced from an outer edge of the bead spreading roller 2 by a distance $l_5$ of 13 mm, and an outer edge of the rim of the 15-inch wheel should preferably be spaced from an outer edge of the bead spreading roller 2 by a distance $l_7$ of 4 mm.

A pair of bead dropping rollers 11 serve to fit an upper tire bead as it is spread by the bead spreading rollers 2 into the wheel. One of the bead spreading rollers 2 and a paired one of the bead dropping rollers 11 are supported on a bracket 29 for co-rotation about the axis of the table lifter 4.

Figure 5:
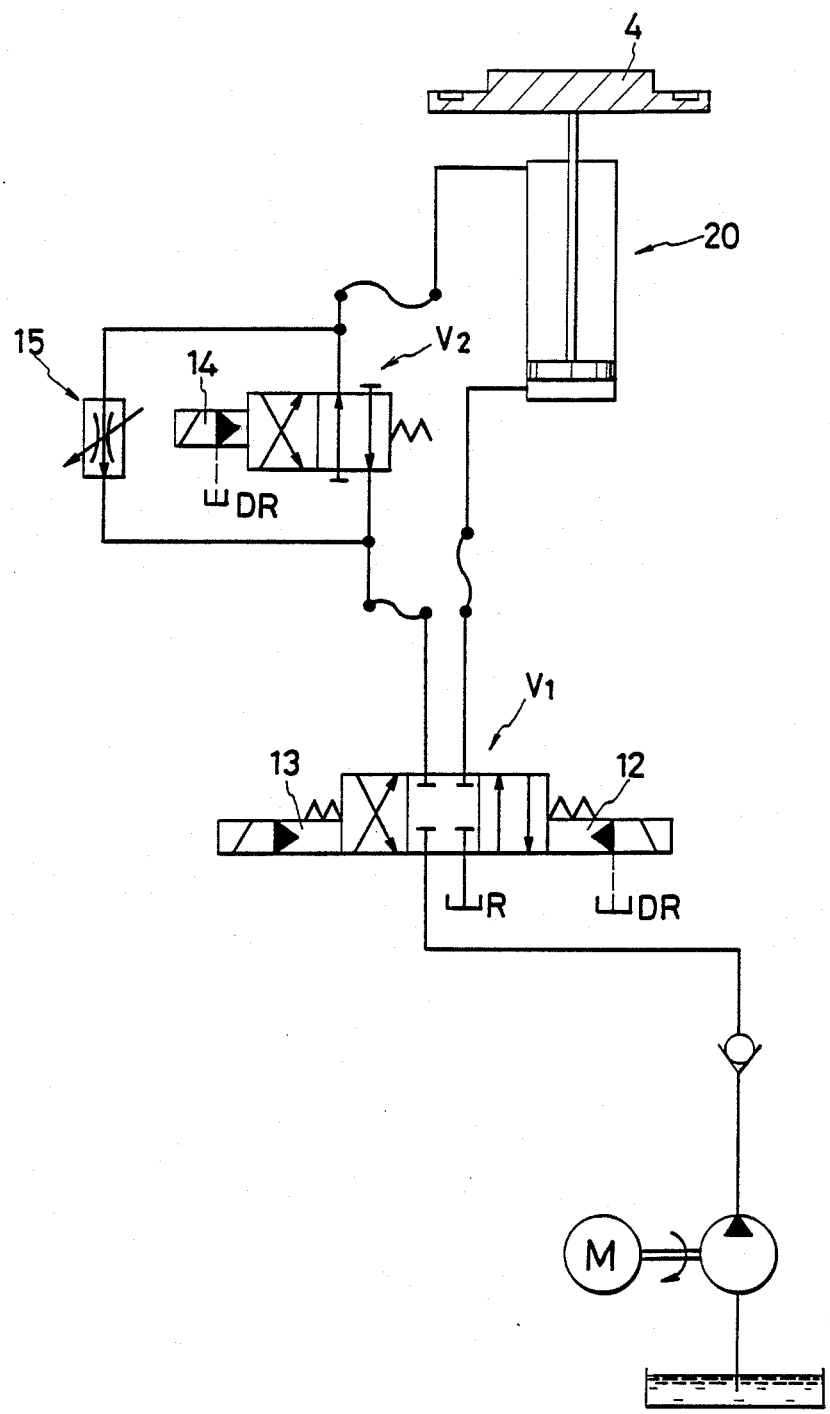
FIG. 5 is a circuit diagram of a hydraulic circuit for use with the apparatus of FIG. 1.

FIG. 5 is a circuit diagram of a hydraulic circuit for raising and lowering the table lifter 4. A solenoid 13 serves to shift a directional control valve $V_1$ in a direction to raise the table lifter 4, and a solenoid 12 serves to shift the directional control valve $V_1$ in a direction to lower the table lifter 4. A solenoid 14 serves to shift a directional control valve $V_2$ associated therewith, and a flow rate control valve 15 adjusts the rate of flow of oil to control the speed of upward movement of the table lifter 4.

Figure 2:
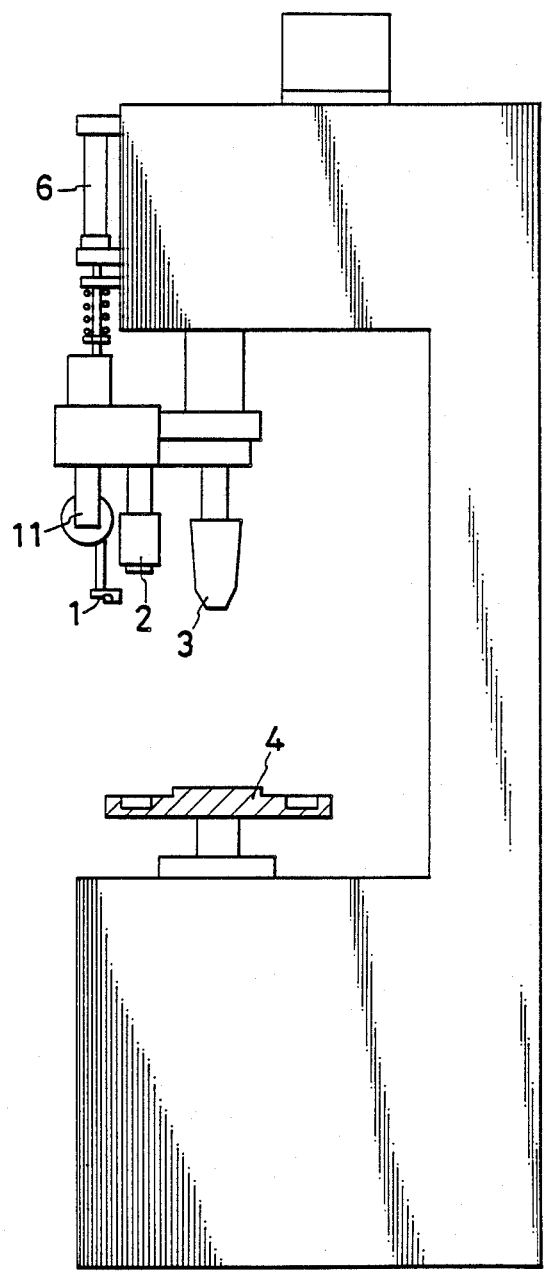
FIG. 2 is a side elevation view of the tire mounting apparatus shown in FIG. 1.
Figure 6A:
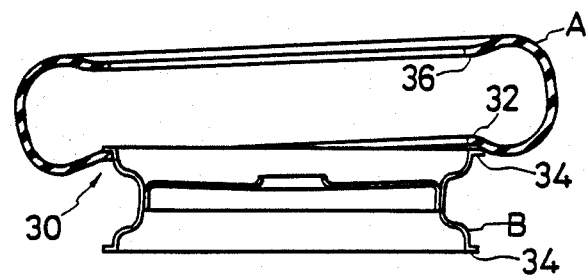
FIGS. 6a, 6b and 6c are side elevational views taken along line 6;13 6 looking in the direction of the arrows to depict the apparatus in various stages of operation.
Figure 6B:
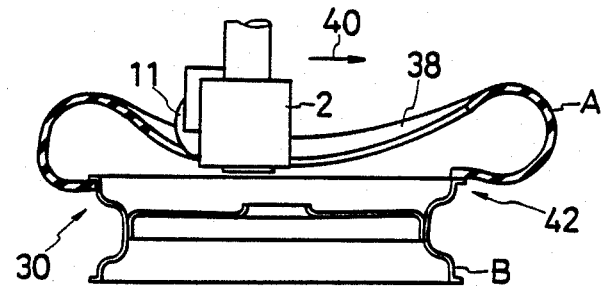
Figure 6C:
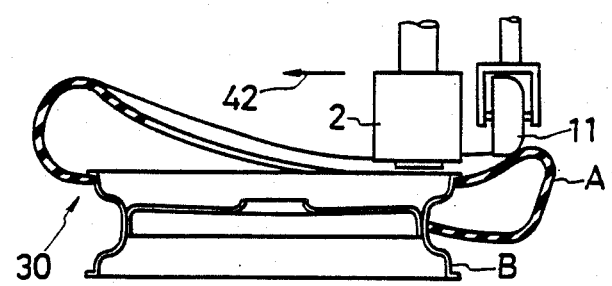

Operation of the tire mounting apparatus thus constructed is as follows: A tire A, as shown in FIGS. 6a–6c, is set on a wheel B that is positioned atop table lifer 4, which is shown in FIGS. 1 and 2. In setting tire A on wheel B, the lower bead 32 of the tire A is partly located between rim edges 34 of the wheel B, as denoted by reference point 30. The starter switch is then turned on. The piston rod 6a of the cylinder actuator 6 is lowered to cause the projection on the stay 26 to depress the limit switch 9, which is then turned on to produce a signal for energizing the solenoids 13, 14, whereupon a hydraulic cylinder actuator 20 is actuated to move the table lifter 4 upwardly. At this time, a motor M for generating hydraulic pressure has already been in operation. The table lifter 4 pushes up the wheel to fit the distal end of the center shaft 3 into the hub hole in the wheel, at which time the wheel is automatically aligned with the table lifter 4. Thereafter, the upper edge of the rim is held against the lower surface of the wheel size detector plate 1, which is pushed up to cause the projection on the support rod 25 to turn on the limit switch 7. The limit switch 7 generates a signal to turn off the solenoid 14, and the oil under back pressure flows from the hydraulic cylinder through the flow rate control valve 15 to drain. The speed of ascending movement of the table lifter 4 is reduced, and the table lifter 4 continues to move up at the reduced speed until the limit switch 8 is turned on by the projection on the support rod 25. When the limit switch 8 is turned on, the solenoid 13 is turned off to shut off the oil flow, thereby stopping the upward movement of the table lifter 4.

As shown in FIG. 6b, the bead spreading rollers 2 are then in engagmeent with at least the upper one 36 of the tire beads, while the bead dropping rollers 11 are depressing the tire frank 38. Movement of the bead dropping rollers 2 across tire flank 38 in conjunction with spreading rollers 2 causes tire "A" to be positioned within the rims of wheel "B", as shown in FIG. 3. At this time, the distances as shown in FIG. 4 are as follows: $l_2$ is 3 mm, $l_6$3 mm, $l_3$15 mm, $l_5$13 mm, and $l_7$4 depending on the size of the wheel.

Thereafter, the piston rod 6a of the pneumatic cylinder actuator 6 is lifted to enable the projection on the stay 26 to turn on the limit switch 10, which produces a signal to rotate the bead spreading rollers 2 in the forward direction indicated by arrow 40 of FIG. 6b away from the above-described point 30. As understood from FIGS. 6b and 6c, the lower tire bead 32 comes along its entire length between the rim edges 34 while the upper tire bead 36 is partly between these edges, when the rollers 2 and 11 come near the point 42 which is diametrically opposite to the point 30. Then, the upper bead of the tire is depressed by the bead dropping rollers 11 into fitting engagement with the wheel as they rotate in the reverse direction indicated by an arrow 42 of FIG. 6c. The tire is now mounted on the wheel. The solenoids 12, 14 are turned on to lower the table lifter 4 to the original position. One cycle of tire mounting operation is thus completed.

The tire mounting apparatus can keep constant the gap between the lower surface of the bead spreading rollers 2 and the upper edge of the wheel rim for any of wheel sizes of 13, 14 and 15 inches. The relative positional relationship between the wheel size detector plate and the limit switches does not need to be changed according to the wheel size. The tire mounting apparatus of the invention is capable of mounting tires without making any adjustment whatsoever at a much higher rate of tire mounting operation.

What is claimed is:

1. A tire mounting apparatus for mounting a flexible tire on a wheel, the apparatus comprising,
   a vertically movable table lifter having on its upper surface a plurality of steps extending circumferentially thereof,
   drive means for raising and lowering said table lifter,
   a vertically movable center shaft disposed coaxially with and upwardly of said table lifter for centering a wheel mounted on the table lifter,
   a vertically movable wheel size detector plate disposed upwardly of said steps on said table lifter having steps for coacting with said steps on said table lifter to abut against the rim of a wheel mounted on the table lifter,
   bead spreading rollers for rotating about an axis of the table lifter, and disposed upwardly in confronting relation to said steps on said table lifter and having axes parallel to the axis of said table lifter and steps on the lower surfaces of said bead spreading roller,
   bead dropping rollers disposed adjacent to said bead spreading rollers for rotation about the axis of said table lifter with said bead spreading rollers, and
   means for controlling said drive means for raising and positioning said table lifter at a height at which a constant vertical distance is maintained between the upper edge of the wheel rim and the lower surface of said bead spreading rollers.

2. A tire mounting apparatus for mounting a flexible tire on a wheel according to claim 1, wherein said table lifter and said detector plate each has two steps.

3. A tire mounting apparatus for mounting a flexible tire on a wheel according to claim 1, wherein the means for controlling the drive means for the table lifter includes means for reducing the raising speed of the table lifter.

4. A tire mounting apparatus for mounting a flexible tire on a wheel according to claim 1, also including means responsive to the position of the detector plate for actuating the bead spreading rollers.

5. A tire mounting apparatus for mounting a flexible tire on a wheel according to claim 4, wherein the actuating means responsive to the position of the detector plate includes a piston pneumatically operated against bias for driving said detector plate and a switch actuated at a predetermined position of said piston.

6. A method of mounting flexible tires on wheels comprising the steps:
   laying a wheel on the upper surface of a table lifter
   centering and fixing the wheel on the table lifter by raising the table against a vertically movable center shaft,
   detecting the size of the wheel by clamping the wheel between the table lifter and a detector plate, and stopping the upward movement of the table lifter, for rotating bead spreading rollers and engaging a lower tire bead with the rim of the wheel, and
   coordinating bead dropping rollers with the bead spreading rollers for engaging the upper tire bead with the rim of the wheel.

* * * * *